United States Patent Office 3,456,432
Patented July 22, 1969

3,456,432
MULTIPLE TWIST SPINDLE
Klaus Nimtz, Willy Heimes, and Ulrich Lossa, Krefeld, Germany, assignors to Palitex Project-Company, G.m.b.H., Krefeld, Germany
Filed Sept. 21, 1967, Ser. No. 669,512
Claims priority, application Germany, Apr. 6, 1967,
P 41,820
Int. Cl. D01h *1/36, 13/04*
U.S. Cl. 57—58.76      5 Claims

ABSTRACT OF THE DISCLOSURE

In a multiple twist spindle in which the protective pot and the winding off bobbin are held in position by radially magnetised permanent magnets, the feature that those fixed to the machine have pole faces which in the direction of the spindle axis dimensionally exceed the corresponding dimension of the pole faces of the cooperating permanent magnets arranged on the protective pot by about 25% or more. The permanent magnets may be magnetised to form poles of alternating polarity in the peripheral direction. The fixed magnets may be of larger extent also in the peripheral direction than the magnets on the pot. Two fixed magnets may be arranged on either side of a spindle separator.

---

Figure 1:
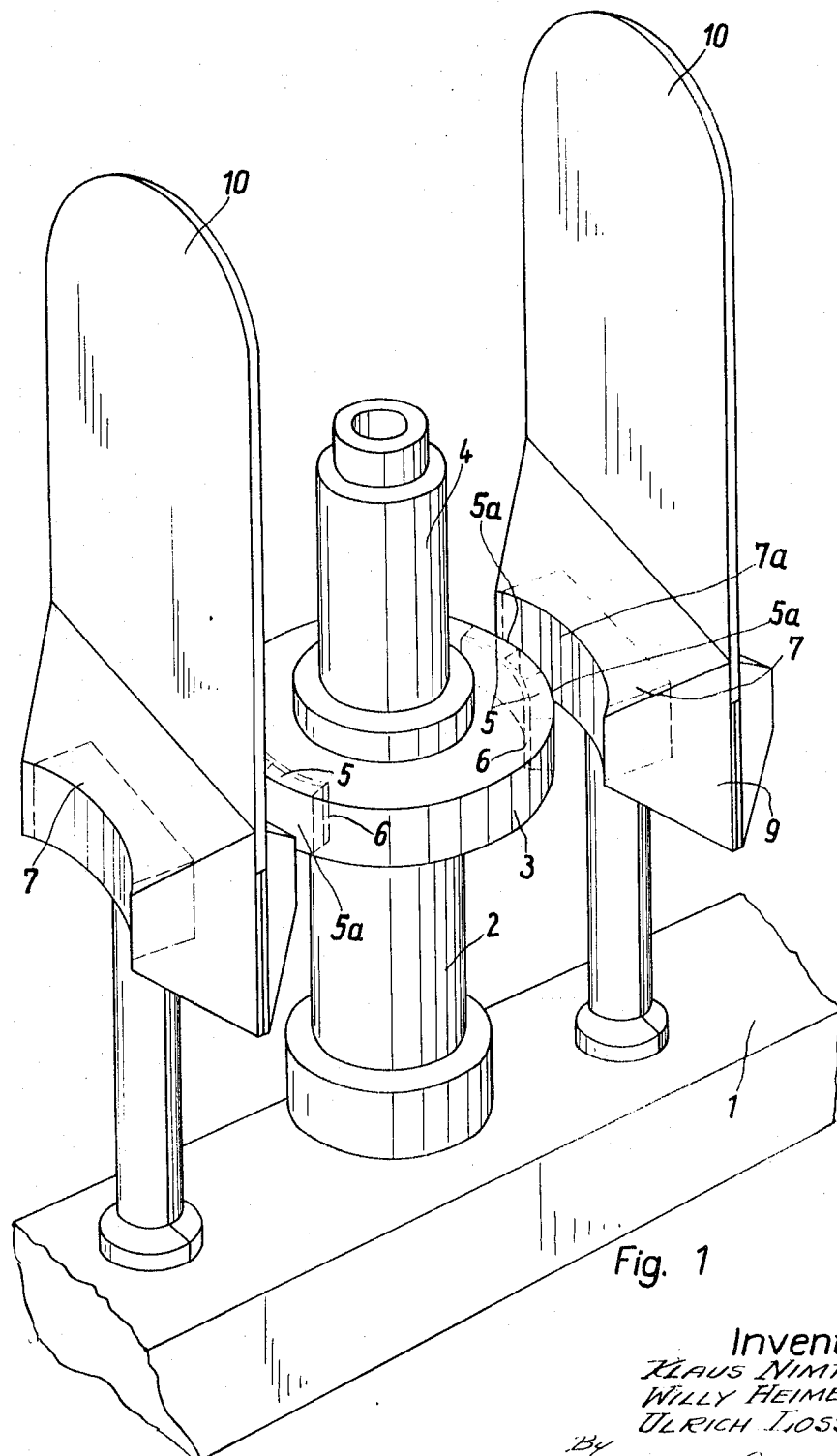

The invention relates to a multiple twist spindle in which the protective pot and the winding-off bobbin are held in position by radially magnetised permanent magnets which face each other and which are mounted in the pot and fixed to the machine respectively. Multiple twist spindles of this kind are already known in the art, the arrangement being such that the magnets in the protective pot and the magnets fixed to the machine are of equal size. This implies that the gap through which the ballooning yarn moves and across which the forces of the permanent magnets take effect must be narrow and confined. No difficulties arise if, as in some multiple twist spindles, a balloon limiter is provided and the permanent magnets are provided at the floor of the pot.

However, difficulties do arise when a balloon limiter is absent and principally when the magnets are located about half way up the pot. It is then desirable that wider gaps should be available without impairment of the locating effect of the magnets. This effect must be sufficiently strong to prevent the pot and hence the winding-off bobbin from being entrained since the machine as well as attendant personnel might then be endangered.

The problem therefore arises of providing the maximum possible permanent magnetic effect across a wide air gap by means of magnets of minimum size. It is more particularly desirable that a multiple twist spindle which works without a balloon limiter should be capable of working flexibly, possibly at higher speeds by permitting the balloon to expand without being restricted by the width of the gap.

According to the invention this problem is solved by providing the fixed permanent magnets, contrary to hitherto conventional magnets, with pole faces which in the direction of the spindle axis exceed the corresponding dimension of the pole faces of the permanent magnet on the pot by about 25% and even more. In this arrangement the effective faces of the permanent magnets in the peripheral direction may be magnetized to form poles of alternate polarity. Moreover, the desired effect can be further improved if the dimensions of the surfaces of the fixed magnets in the direction of the spindle periphery exceed the corresponding surfaces of the cooperating permanent magnets on the pot. Preferably the latter magnets may be dimensionally bounded in the peripheral direction by the sides of the centre angle defined by the fixed magnet.

The fact that the arrangement the invention proposes to provide permits the air gap between the permanent magnet in the protective pot and the permanent magnet which is affixed to the machine to be relatively wide affords possibilities of modifying the overall design of the entire multiple twist spindle in various respects. Among other matters the space required inside the protective pot is reduced and the dimensions of the protective pot can thus be better utilised for accommodating the winding-off bobbin. Moreover, the permanent magnets can be located fairly far downwards towards the bottom of the protective pot without any interference with the shape of the balloon.

In multiple twist spindles which lack a balloon limiter the magnets which are fixed to the machine may be supported by a magnet holder which simultaneously holds the separators. The resultant design is thus simplified and functionally more convenient.

Figure 2:
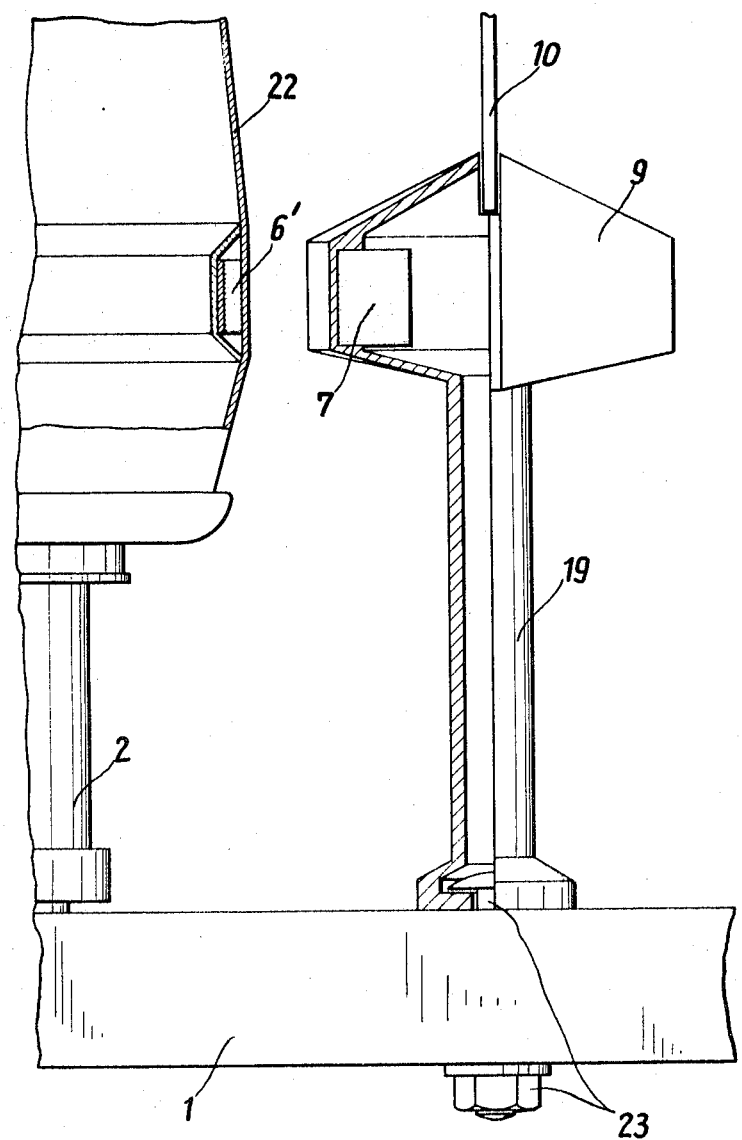
Figure 3:
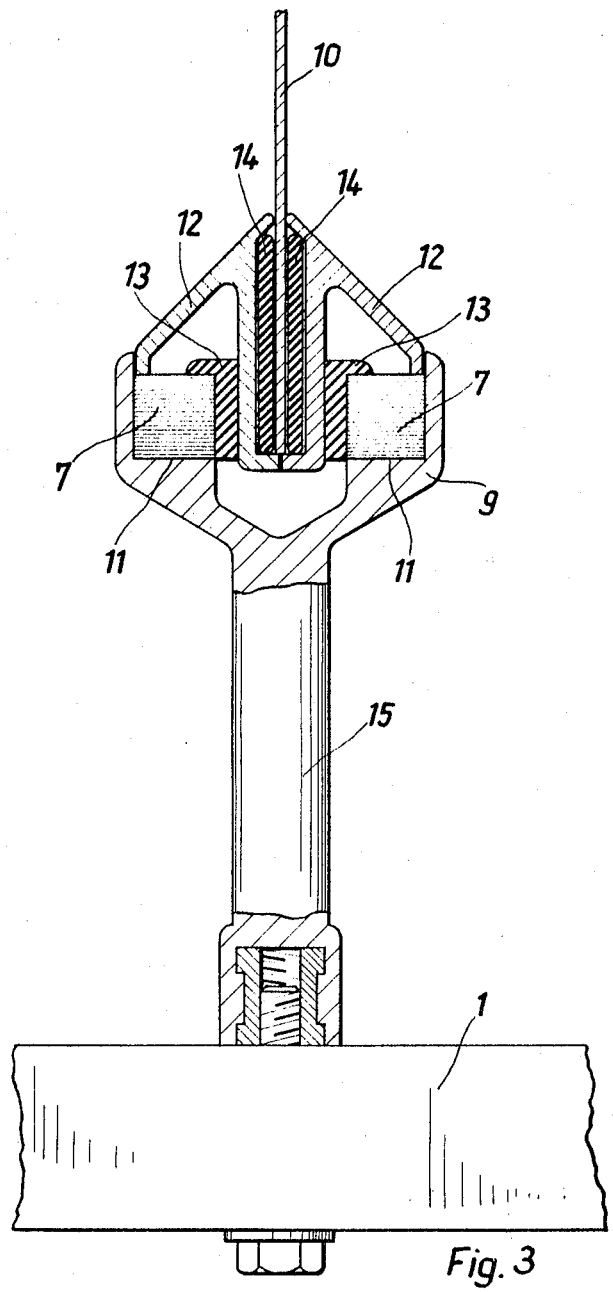
Figure 4:
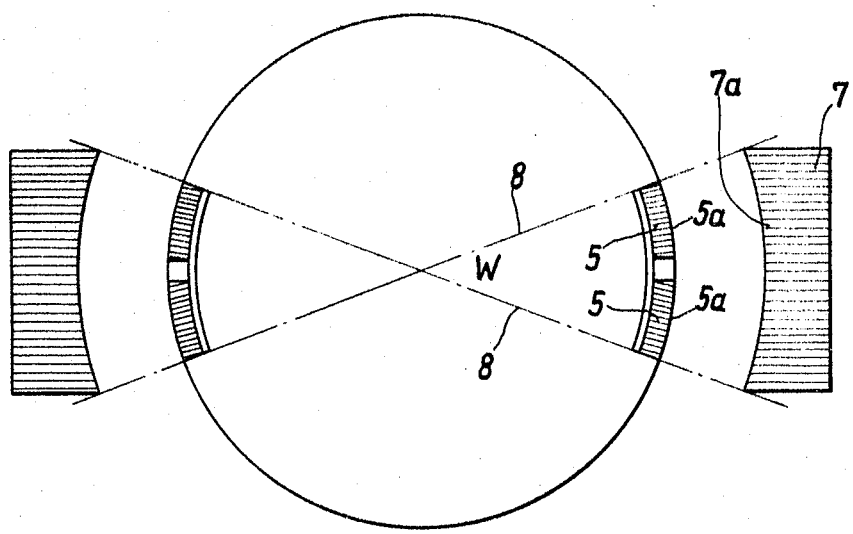

Preferred embodiments of the invention are shown in the drawings in which:

FIG. 1 is a perspective representation of an arrangement according to the invention, FIG. 2 is a view of the disposition of a spindle and of a separator, each shown partly in section, FIG. 3 is an elevational part section of a separator and FIG. 4 is a schematic illustration of the disposition of the magnets in a horizontal section taken at the level of the magnets through the spindle and magnet holder.

In conventional manner the permanent magnet twist spindle carrying the wharve 2 and the bottom 3 of the protective pot is mounted in the spindle bench 1. The other components of the spindle, with the exception of the bobbin mounting 4, are omitted for the sake of greater clarity.

The permanent magnets 5 are located in the bottom 3 of the pot. In the illustrated example two permanent magnets 5 are disposed side by side and separated by a narrow air gap. However, a single magnet or more than two magnets disposed side by side could likewise be provided. Conveniently, the magnets are mounted on an iron yoke 6.

These permanent magnets are faced by permanent magnets 7 affixed to the frame of the multiple twist machine. The dimensions of the pole faces 7a of these fixed permanent magnets 7 in the direction of the spindle axis exceed the corresponding dimensions of the pole faces 5a of the permanent magnet pairs 5 by about 25% or even more. These relative dimensions are sufficient to ensure that the protective pot and hence the winding-off bobbin will be retained in position by a minimum bulk of permanent magnet material, even when the gap width is very considerable. The effect can be further improved if, as shown in FIG. 4, the face of the permanent magnet 7 is also of larger area in the direction of the spindle periphery than the corresponding permanent magnet pair 5 on the pot. Preferably the permanent magnet pair 5 should be bounded by the sides 8 of the centre angle W defined by the fixed permanent magnet 7.

Another desirable arrangement consists in magnetising the permanent magnets in the direction of the spindle periphery to form poles of alternating polarity. If tow permanent magnets 5 are provided, then one of these magnets may have a south pole as the effective pole and the other a north pole as the effective pole. Alternatively, a single permanent magnet may have an effective face so magnetised that poles of alternate polarity are formed thereon. A suitable material would preferably be an oxidic permanent magnet material.

The manner in which the fixed permanent magnets 7 are mounted or affixed to the machine is in principle discretionary. However, in an advantageous arrangement shown in FIG. 1, two fixed permanent magnets may be located in a magnet holder 9 which also serves as a mount for the separator plate 10. Whereas in the embodiment according to FIG. 1 the permanent magnets are located in the region of the bottom of the pot on the spindle, the magnets 6' in the embodiment according to FIG. 2 are located about half way up the side of the pot 22. The fixed permanent magnets 7 and the separator plates 10 are supported by the magnet holder 9. This holder together with the strut 19 is of divided construction. When the magnets 7 have been inserted the two parts are combined with the interposition of the plate 10 when they are mounted on the spindle bench 1. They are then held together by the bolt 23 securing the parts to the bench.

FIG. 3 is a different form of construction of the permanent magnet holder. The holder 9 proper for the permanent magnets 7 is preferably trough-shaped and formed with two supporting faces 11 for the permanent magnets 7. The permanent magnets 7 are located in the trough by two inserted cap parts 12 which, and through the interposed flexible insertions 13, made for instance of rubber or the like, tightly bear against the sides of the magnets. The cap members 12 also grip the separator plate 10 between elastic liners 14. The magnet holder and the separator plate are secured to the spindle bench 1 by means of a strut 15.

It will be readily understood that the magnets might be located in some alternative way and that the designer has a wide discretion of choice because the cooperation of the relatively large fixed magnets with the relatively small movable magnets provides an unusually strong retaining force.

What is claimed is:

1. A multiple twist spindle, comprising a protective pot member and a mount member for winding-off bobbin, and radially magnetised permanent magnets which face each other and which are porvided on the protective pot and fixed in position externally of said pot respectively, the improvement which consists in that the said fixed radially magnitised permanent magnets have pole faces which in the direction of the spindle axis dimensionally exceed the corresponding dimension of the pole faces of the radially magnetised permanent magnets on the protective pot by at least approximately 25%.

2. A multiple twist spindle according to claim 1, in which the effective faces of the facing permanent magnets are magnitised to form poles of alternating polarity in the peripheral direction.

3. A multiple twist spindle according to claim 1, in which the effective pole faces of the said fixed magnets are of larger extent in the direction of the spindle periphery than those of the corresponding permanent magnets on the protective pot.

4. A multiple twist spindle according to claim 3, in which the effective pole face on the pot is bounded by the sides of the centre angle defined by the opposed fixed external pole face.

5. A multiple twist spindle according to claim 1, comprising a magnet holder and a separator carried thereby and wherein two said externally fixed permanent magnets are located in the magnet holder for cooperation with the magnets on pots on spindles on opposite sides of the separator.

References Cited

UNITED STATES PATENTS

| 2,374,085 | 4/1945 | Gwaltney et al. | 57—58.76 XR |
| 2,473,521 | 6/1949 | Gwaltney | 57—58.76 |
| 3,343,359 | 9/1967 | Franzen et al. | 57—58.76 |
| 3,368,337 | 2/1968 | Franzen | 57—58.76 |

FOREIGN PATENTS

| 1,084,943 | 7/1954 | France. |

JOHN PETRAKES, Primary Examiner

U.S. Cl. X.R.

57—58.83, 108